(12) United States Patent
Doi et al.

(10) Patent No.: US 8,229,251 B2
(45) Date of Patent: Jul. 24, 2012

(54) PRE-PROCESSING OPTIMIZATION OF AN IMAGE PROCESSING SYSTEM

(75) Inventors: Munehiro Doi, Yasu (JP); Moon J. Kim, Wappingers Falls, NY (US); Yumi Mori, Yamato (JP); Hangu Yeo, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 12/028,073

(22) Filed: Feb. 8, 2008

(65) Prior Publication Data

US 2009/0202149 A1 Aug. 13, 2009

(51) Int. Cl.
*G06K 9/34* (2006.01)
*G06K 9/46* (2006.01)
*G06K 9/60* (2006.01)
*G05B 19/18* (2006.01)
*G06T 1/20* (2006.01)
*G06F 12/02* (2006.01)
*G09G 5/02* (2006.01)
*G09G 5/10* (2006.01)

(52) U.S. Cl. ........ 382/304; 382/173; 382/237; 382/303; 700/2; 700/4; 700/5; 345/506; 345/544; 345/596; 345/690; 345/691; 345/692; 345/693; 345/694; 345/695; 345/697

(58) Field of Classification Search ............... None
See application file for complete search history.

(56) References Cited

U.S. PATENT DOCUMENTS

| | | | |
|---|---|---|---|
| 4,517,593 A | 5/1985 | Keller et al. | |
| 4,893,188 A * | 1/1990 | Murakami et al. | 358/2.1 |
| 5,136,662 A * | 8/1992 | Maruyama et al. | 382/308 |
| 5,506,999 A | 4/1996 | Skillman et al. | |
| 5,621,811 A | 4/1997 | Roder et al. | |
| 5,659,630 A | 8/1997 | Forslund | |
| 5,721,883 A | 2/1998 | Katsuo et al. | |
| 5,809,078 A | 9/1998 | Tani et al. | |
| 5,956,081 A | 9/1999 | Katz et al. | |
| 6,023,637 A | 2/2000 | Liu et al. | |
| 6,025,854 A | 2/2000 | Hinz et al. | |

(Continued)

FOREIGN PATENT DOCUMENTS

EP 1345120 A2 9/2003

(Continued)

OTHER PUBLICATIONS

Kim et al., U.S. Appl. No. 11/940,506, Office Action Communication, Nov. 2, 2009, 20 pages.

(Continued)

*Primary Examiner* — Michelle Entezari
(74) *Attorney, Agent, or Firm* — Hoffman Warnick LLC; William E. Schiesser

(57) ABSTRACT

The present approach increases bandwidth by performing at least two functions at the pre-processing level. Specifically, under the present approach, program code is structured so that the segmentation and binarization functions/modules (and optionally a blob analysis function/module) are merged into a single module to reduce memory bandwidth. In addition, each image frame is segmented into a plurality of partitions (e.g., vertical strips) to enhance the reusability of the image data in LS already fetched from main memory. Each partition is then processed by a separate one of a plurality of processing engines, thereby increasing the utilization of all processing engines and allowing the processing engines to maintain good bandwidth.

20 Claims, 10 Drawing Sheets

U.S. PATENT DOCUMENTS

| | | | |
|---|---|---|---|
| 6,081,659 A | 6/2000 | Garza et al. | |
| 6,166,373 A | 12/2000 | Mao | |
| 6,215,898 B1 | 4/2001 | Woodfill et al. | |
| 6,404,902 B1 | 6/2002 | Takano et al. | |
| 6,456,737 B1 | 9/2002 | Woodfill et al. | |
| 6,487,619 B1 | 11/2002 | Takagi | |
| 6,549,992 B1 | 4/2003 | Armangau et al. | |
| 6,567,622 B2 | 5/2003 | Phillips | |
| 6,647,415 B1 | 11/2003 | Olarig et al. | |
| 6,661,931 B1 | 12/2003 | Kawada | |
| 6,671,397 B1 | 12/2003 | Mahon et al. | |
| 6,744,931 B2 | 6/2004 | Komiya et al. | |
| 6,825,943 B1 | 11/2004 | Barry et al. | |
| 6,829,378 B2 | 12/2004 | DiFilippo et al. | |
| 6,898,634 B2 | 5/2005 | Collins et al. | |
| 6,898,670 B2 | 5/2005 | Nahum | |
| 6,950,394 B1 | 9/2005 | Chou et al. | |
| 7,000,145 B2 | 2/2006 | Werner et al. | |
| 7,016,996 B1 | 3/2006 | Schober | |
| 7,043,745 B2 | 5/2006 | Nygren et al. | |
| 7,065,618 B1 | 6/2006 | Ghemawat et al. | |
| 7,076,569 B1 | 7/2006 | Bailey et al. | |
| 7,095,882 B2 | 8/2006 | Akahori | |
| 7,102,777 B2 | 9/2006 | Haraguchi | |
| 7,106,895 B1 | 9/2006 | Goldberg et al. | |
| 7,142,725 B2 | 11/2006 | Komiya et al. | |
| 7,171,036 B1 | 1/2007 | Liu et al. | |
| 7,225,324 B2 | 5/2007 | Huppenthal et al. | |
| 7,243,116 B2 | 7/2007 | Suzuki et al. | |
| 7,299,322 B2 | 11/2007 | Hosouchi et al. | |
| 7,327,889 B1* | 2/2008 | Imai et al. | 382/218 |
| 7,430,622 B1 | 9/2008 | Owen | |
| 7,480,441 B2 | 1/2009 | Klausberger et al. | |
| 7,523,148 B2 | 4/2009 | Suzuki et al. | |
| 7,602,394 B2* | 10/2009 | Seki et al. | 345/501 |
| 7,605,818 B2* | 10/2009 | Nagao et al. | 345/501 |
| 7,743,087 B1 | 6/2010 | Anderson et al. | |
| 7,801,895 B2 | 9/2010 | Hepper et al. | |
| 8,078,837 B2* | 12/2011 | Kajihara | 712/31 |
| 8,085,272 B1* | 12/2011 | Molnar et al. | 345/505 |
| 8,094,157 B1* | 1/2012 | Le Grand | 345/505 |
| 2002/0002636 A1 | 1/2002 | Vange et al. | |
| 2002/0129216 A1 | 9/2002 | Collins | |
| 2002/0164059 A1 | 11/2002 | DiFilippo et al. | |
| 2002/0198371 A1 | 12/2002 | Wang | |
| 2003/0031355 A1 | 2/2003 | Nagatsuka | |
| 2003/0053118 A1 | 3/2003 | Muramoto et al. | |
| 2003/0092980 A1 | 5/2003 | Nitz | |
| 2003/0113034 A1 | 6/2003 | Komiya et al. | |
| 2004/0024810 A1 | 2/2004 | Choubey et al. | |
| 2004/0062265 A1 | 4/2004 | Poledna | |
| 2004/0062454 A1 | 4/2004 | Komiya et al. | |
| 2004/0091243 A1 | 5/2004 | Theriault et al. | |
| 2004/0122790 A1 | 6/2004 | Walker et al. | |
| 2004/0143631 A1 | 7/2004 | Banerjee et al. | |
| 2004/0153751 A1* | 8/2004 | Marshall et al. | 714/11 |
| 2004/0156546 A1 | 8/2004 | Kloth | |
| 2004/0170313 A1 | 9/2004 | Nakano et al. | |
| 2004/0186371 A1 | 9/2004 | Toda | |
| 2004/0217956 A1 | 11/2004 | Besl et al. | |
| 2004/0228515 A1 | 11/2004 | Okabe et al. | |
| 2004/0233036 A1 | 11/2004 | Sefton | |
| 2004/0252467 A1 | 12/2004 | Dobbs et al. | |
| 2005/0013960 A1 | 1/2005 | Ozeki et al. | |
| 2005/0022038 A1 | 1/2005 | Kaushik et al. | |
| 2005/0044132 A1 | 2/2005 | Campbell et al. | |
| 2005/0063575 A1 | 3/2005 | Ma et al. | |
| 2005/0080928 A1 | 4/2005 | Beverly et al. | |
| 2005/0083338 A1 | 4/2005 | Yun et al. | |
| 2005/0084137 A1 | 4/2005 | Kim et al. | |
| 2005/0093990 A1 | 5/2005 | Aoyama | |
| 2005/0113960 A1 | 5/2005 | Karau et al. | |
| 2005/0126505 A1* | 6/2005 | Gallager et al. | 119/234 |
| 2005/0219253 A1 | 10/2005 | Piazza et al. | |
| 2005/0259866 A1* | 11/2005 | Jacobs et al. | 382/157 |
| 2005/0263678 A1 | 12/2005 | Arakawa | |
| 2006/0013473 A1 | 1/2006 | Woodfill et al. | |
| 2006/0117238 A1 | 6/2006 | DeVries et al. | |
| 2006/0135117 A1 | 6/2006 | Laumen et al. | |
| 2006/0149798 A1 | 7/2006 | Yamagami | |
| 2006/0171452 A1 | 8/2006 | Waehner | |
| 2006/0184296 A1 | 8/2006 | Voeller et al. | |
| 2006/0190627 A1 | 8/2006 | Wu et al. | |
| 2006/0235863 A1 | 10/2006 | Khan | |
| 2006/0239194 A1 | 10/2006 | Chapell | |
| 2006/0250514 A1 | 11/2006 | Inoue et al. | |
| 2006/0268357 A1 | 11/2006 | Vook et al. | |
| 2006/0269119 A1 | 11/2006 | Goldberg et al. | |
| 2006/0274971 A1* | 12/2006 | Kumazawa et al. | 382/276 |
| 2006/0279750 A1 | 12/2006 | Ha | |
| 2007/0126744 A1 | 6/2007 | Tsutsumi | |
| 2007/0159642 A1 | 7/2007 | Choi | |
| 2007/0245097 A1 | 10/2007 | Gschwind et al. | |
| 2007/0250519 A1 | 10/2007 | Fineberg et al. | |
| 2008/0013862 A1* | 1/2008 | Isaka et al. | 382/303 |
| 2008/0036780 A1 | 2/2008 | Liang et al. | |
| 2008/0063387 A1 | 3/2008 | Yahata et al. | |
| 2008/0092744 A1 | 4/2008 | Storbo et al. | |
| 2008/0129740 A1* | 6/2008 | Itagaki et al. | 345/502 |
| 2008/0140771 A1 | 6/2008 | Vass et al. | |
| 2008/0144880 A1* | 6/2008 | DeLuca | 382/100 |
| 2008/0147781 A1 | 6/2008 | Hopmann et al. | |
| 2008/0177964 A1 | 7/2008 | Takahashi et al. | |
| 2008/0259086 A1* | 10/2008 | Doi et al. | 345/502 |
| 2008/0260297 A1 | 10/2008 | Chung et al. | |
| 2008/0263154 A1 | 10/2008 | Van Datta | |
| 2008/0270979 A1 | 10/2008 | McCool et al. | |
| 2009/0003542 A1 | 1/2009 | Ramanathan et al. | |
| 2009/0052542 A1 | 2/2009 | Romanovskiy et al. | |
| 2009/0066706 A1 | 3/2009 | Yasue et al. | |
| 2009/0074052 A1 | 3/2009 | Fukuhara et al. | |
| 2009/0083263 A1 | 3/2009 | Felch et al. | |
| 2009/0089462 A1 | 4/2009 | Strutt | |
| 2009/0150555 A1 | 6/2009 | Kim et al. | |
| 2009/0150556 A1 | 6/2009 | Kim et al. | |
| 2009/0187654 A1 | 7/2009 | Raja et al. | |
| 2009/0265396 A1 | 10/2009 | Ram et al. | |
| 2010/0060651 A1* | 3/2010 | Gala | 345/506 |

FOREIGN PATENT DOCUMENTS

| | | |
|---|---|---|
| WO | 0068884 | 11/2000 |

OTHER PUBLICATIONS

Kim et al., U.S. Appl. No. 11/951,709, Office Action Communication, Nov. 17, 2009, 20 pages.

Kim et al., U.S. Appl. No. 11/951,712, Office Action Communication, Sep. 9, 2009, 26 pages.

Kim et al., U.S. Appl. No. 11/940,470, Office Action Communication, Nov. 18, 2009, 31 pages.

Tsung Yin Tsai, U.S. Appl. No. 11/738,711, Office Action Communication, Feb. 18, 2011, 17 pages.

Tsung Yin Tsai, U.S. Appl. No. 11/738,723, Office Action Communication, Feb. 18, 2011, 17 pages.

Cosby, Lawrence V., U.S. Appl. No. 11/940.470, Office Action Communication, Mar. 4, 2011, 22 pages.

Yang, Qian, U.S. Appl. No. 11/767,728, Office Action Communication, Mar. 15, 2011, 34 pages.

Yang, Qian, U.S. Appl. No. 11/877,926, Office Action Communication, Mar. 23, 2011, 32 pages.

Bitar, Nancy, U.S. Appl. No. 11/782,170, Office Action Communication, Mar. 17, 2011, 19 pages.

Kim et al., U.S. Appl. No. 11/940,470, Office Action Communication, Jun. 9, 2010, 26 pages.

Kim et al., U.S. Appl. No. 11/940,506, Office Action Communication, May 14, 2010, 16 pages.

Kim et al., U.S. Appl. No. 11/951,709, Office Action Communication, May 14, 2010, 24 pages.

Tiv, U.S. Appl. No. 11/951,712, Office Action Communication, Apr. 26, 2011, 20 pages.

Tsai, U.S. Appl. No. 11/738,711, Office Action Communication, May 23, 2011, 16 pages.

Tsai, U.S. Appl. No. 11/738,723, Office Action Communication, May 23, 2011, 16 pages.

Chung et al., U.S. Appl. No. 11/738,711, Office Action Communication, Jun. 25, 2010, 26 pages.
Chung et al., U.S. Appl. No. 11/738,723, Office Action Communication, Jun. 24, 2010, 26 pages.
Kim et al., U.S. Appl. No. 11/951,712, Office Action Communication, Jul. 23, 2010, 25 pages.
Yang, U.S. Appl. No. 11/767,728, Office Action Communication, Jul. 28, 2011, 32 pages.
Patent Cooperation Treaty, International Application Number: PCT/EP2008/054331, Filed Oct. 4, 2008, International Search Report and Written Opinion of the International Searching Authority, Jul. 28, 2008, 10 pages.
Bitar, U.S. Appl. No. 11/782,170, Office Action Communication, Sep. 16, 2011, 21 pages.
Tsai, U.S. Appl. No. 11/738,711, Office Action Communication, Sep. 23, 2011, 20 pages.
Tsai, U.S. Appl. No. 11/738,723, Office Action Communication, Sep. 27, 2011, 20 pages.
Tiv, U.S. Appl. No. 11/951,712, Office Action Communication, Oct. 21, 2011, 27 pages.
Chambers, U.S. Appl. No. 11/951,709, Office Action Communication, Nov. 29, 2010, 21 pages.
Yang, U.S. Appl. No. 11/877,926, Office Action Communication, Nov. 22, 2010, 33 pages.
Cosby, U.S. Appl. No. 11/940,470, Office Action Communication, Nov. 26, 2010, 19 pages.
Ansari, U.S. Appl. No. 11/940,506, Office Action Communication, Oct. 29, 2010, 21 pages.
Tsai, U.S. Appl. No. 11/738,711, Office Action Communication, Nov. 9, 2010, 13 pages.
Yang, U.S. Appl. No. 11/767,728, Office Action Communication, Nov. 19, 2010, 25 pages.
Tsai, U.S. Appl. No. 11/738,723, Office Action Communication, Nov. 17, 2010, 13 pages.
Yang, U.S. Appl. No. 11/767,728, Office Action Communication, Oct. 28, 2011, 33 pages.
Tsai, U.S. Appl. No. 11/738,711, Office Action Communication, Nov. 4, 2011, 14 pages.
Tsai, U.S. Appl. No. 11/738,723, Office Action Communication, Nov. 4, 2011, 15 pages.
Chambers, U.S. Appl. No. 11/951,709, Office Action Communication, Dec. 20, 2011, 40 pages.
Cosby, U.S. Appl. No. 11/940,470, Office Action Communication, Dec. 22, 2011, 41 pages.
Yang, U.S. Appl. No. 11/877,926, Office Action Communication, Jan. 4, 2012, 40 pages.
Do, U.S. Appl. No. 11/668,875, Notice of Allowance & Fees Due, Aug. 13, 2010, 9 pages.
Do, U.S. Appl. No. 11/668,875, Notice of Allowance & Fees Due, Sep. 20, 2010, 8 pages.
Kuhnen, PCT / EP2008 / 050443, Invitation to Pay Additional Fees, Apr. 25, 2008, 6 pages.
Eveno, PCT / EP2008 / 050443, International Search Report, Jul. 22, 2008, 5 pages.
Cussac, PCT / EP2008 / 050443, PCT International Preliminary Report on Patentability, Aug. 4, 2009, 8 pages.
Tiv, U.S. Appl. No. 11/951,712, Office Action Communication, Jan. 5, 2011, 18 pages.
Yang, U.S. Appl. No. 11/767,728, Office Action Communication, Feb. 16, 2012, 33 pages.
Bitar, U.S. Appl. No. 11/782,170, Notice of Allowance and Fees Due, Feb. 21, 2012, 20 pages.
Chambers, U.S. Appl. No. 11/951,709, Office Action Communication, Mar. 21, 2012, 27 pages.
Yang, U.S. Appl. No. 11/877,926, Office Action Communication, Apr. 27, 2012, 32 pages.
Yang, U.S. Appl. No. 11/767,728, Office Action Communication, May 21, 2012, 49 pages.
Tsai, U.S. Appl. No. 11/738,711, Notice of Allowance & Fees Due, May 25, 2012, 5 pages.
Tsai, U.S. Appl. No. 11/738,723, Notice of Allowance & Fees Due, May 25, 2012, 31 pages.
Kim, U.S. Appl. No. 12/057,942, Office Action Communication, Jun. 7, 2012, 58 pages.

* cited by examiner

PRE-PROCESSING OPTIMIZATION OF AN IMAGE PROCESSING SYSTEM

CROSS-REFERENCE TO RELATED APPLICATION

This application is related in some aspects to commonly owned and co-pending patent application Ser. No. 11/877,926, entitled "HIGH BANDWIDTH IMAGE PROCESSING SYSTEM", filed Oct. 24, 2007, the entire contents of which are herein incorporated by reference. This application is also related in some aspects to commonly owned and co-pending patent application Ser. No. 11/767,728, entitled "HYBRID IMAGE PROCESSING SYSTEM", filed Jun. 25, 2007, the entire contents of which are herein incorporated by reference. This application is also related in some aspects to commonly owned and co-pending patent application Ser. No. 11/738,723, entitled "HETEROGENEOUS IMAGE PROCESSING SYSTEM", filed Apr. 23, 2007, the entire contents of which are herein incorporated by reference. This application is also related in some aspects to commonly owned and co-pending patent application Ser. No. 11/738,711, entitled "HETEROGENEOUS IMAGE PROCESSING SYSTEM", filed Apr. 23, 2007, the entire contents of which are herein incorporated by reference.

FIELD OF THE INVENTION

In general, the present invention relates to image processing/inspection. Specifically, the present invention relates to an approach for optimizing the preprocessing operation of an image processing system.

BACKGROUND OF THE INVENTION

Current image processing/inspection systems have limited processing power. Specifically, current systems perform all image processing functions within a single, general-purpose system. The processor used in current image processing/inspection systems is not powerful enough to handle the image processing demands, data rates, and algorithms for much of the current generation of systems (e.g., manufacturing inspection systems), let alone the next generation of systems. Next-generation manufacturing inspection systems have a need for a fast image processing system in order to complete image inspection within required times. As the size of the inspection area and the amount of gray scale data double, the data per one scan area increases dramatically. Therefore, the image inspection processing time is drastically increased. Thus, the current inspection system(s) will not adequately handle the requirements for future manufacturing systems.

Although, image processing functions are sometimes offloaded to another system, this other system also uses a general purpose processor that fails to actually perform any image processing acceleration. In addition, image processing functions in current systems are tied to a specific processor and platform, making it difficult to offload and accelerate specific functions at a fine-grained level.

There are customer requirements to increase the bandwidth from the current implementations. Unfortunately, no existing approach allows the bandwidth of existing implementations to be increased on the pre-processing level.

SUMMARY OF THE INVENTION

This invention relates to machine vision computing environments, and more specifically relates to a system and method for selectively accelerating the execution of image processing applications using a high bandwidth (e.g., hybrid) computing system. We define a hybrid system as one that is multi-platform, and potentially distributed via a network or other connection. The present approach increases bandwidth by performing at least two functions at the pre-processing level. Specifically, under the present approach, program code is structured so that the segmentation and binarization functions/modules (and optionally a blob analysis function/module) are merged into a single module to reduce memory bandwidth. In addition, each image frame is segmented into a plurality of partitions (e.g., vertical strips) to enhance the reusability of the image data in LS already fetched from main memory. Each partition is then processed by a separate one of a plurality of processing engines, thereby increasing the utilization of all processing engines and allowing the processing engines to maintain good bandwidth.

A first aspect of the present invention provides a method for optimizing an image processing system, comprising: structuring code of the image processing system to combine a segmentation function and a binarization function into a single module; segmenting each frame of the image data received by the image processing system into a plurality of partitions; and processing each of the plurality of partitions with a separate one of a plurality of processing engines.

A second aspect of the present invention provides an image processing system, comprising: a module for segmenting each frame of the image data into a plurality of partitions and for binarizing the image data; and a plurality of processing engines for processing the image data, the plurality of processing engines each processing a different one of the plurality of partitions.

A third aspect of the present invention provides a method for processing images, comprising: receiving image data on an interface unit from a set of image recordation mechanisms; sending the image data and commands for processing the image data to an image processing unit; segmenting each frame of the image data into a plurality of partitions; and processing the plurality of partitions with a plurality of processing engines, each of the plurality of processing engines processing a different one of the plurality of partitions.

A fourth aspect of the present invention provides a program product stored on a computer readable medium for processing images, the computer readable medium comprising program code for causing a computer system to: receive image data on an image interface unit from a plurality of image recordation mechanisms; send the image data and commands for processing the image data to an image processing unit; segment each frame of the image data into a plurality of partitions; and process the plurality of partitions with a plurality of processing engines, each of the plurality of processing engines processing a different one of the plurality of partitions.

A fifth aspect of the present invention provides a method for deploying an application for processing images, comprising: providing a computer infrastructure being operable to: receive image data image on an interface unit from a plurality of image recordation mechanisms; send the image data and commands for processing the image data to an image processing unit; segment the image data into a plurality of partitions; and process the plurality of partitions with a plurality of processing engines, each of the plurality of processing engines processing a different one of the set of partitions.

A sixth aspect of the present invention provides a data processing system for processing images, comprising: a memory medium having instructions; receive image data image on an interface unit from a plurality of image recordation mechanisms; send the image data and commands for processing the image data to an image processing unit; segment the image data into a plurality of partitions; and process the plurality of partitions with a plurality of processing engines, each of the plurality of processing engines processing a different one of the set of partitions.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

For clarity, the Detailed Description of the Invention has the following Sections:
I. General Description
II. Illustrative Embodiments
III. Computerized Implementation I. General Description As indicated above, this solution relates to machine vision computing environments, and more specifically relates to a system and method for selectively accelerating the execution of image processing applications using a high bandwidth (e.g., hybrid) computing system. We define a hybrid system as one that is multi-platform, and potentially distributed via a network or other connection. The present approach increases bandwidth by performing at least two functions at the pre-processing level. Specifically, under the present approach, program code is structured so that the segmentation and binarization functions/modules (and optionally a blob analysis function/module) are merged into a single module to reduce memory bandwidth. In addition, each image frame is segmented into a plurality of partitions (e.g., vertical strips) to enhance the reusability of the image data in LS already fetched from main memory. Each partition is then processed by a separate one of a plurality of processing engines, thereby increasing the utilization of all processing engines and allowing the processing engines to maintain good bandwidth.

As such, the high bandwidth image processing system of the present invention generally includes an image interface unit and an image processing unit. The image interface unit comprises a set of servers each comprising a universal operating system (such as Linux) and will receive image data corresponding to a set (i.e., at least one) of images, generate commands for processing the image data, and send the images and the commands to an image processing unit (of the high bandwidth image processing system) that also has a universal operating system. Upon receipt, the image processing unit will recognize and interpret the commands, assign and/or schedule tasks for processing the image data to a set of (e.g., special) processing engines based on the commands, and return results and/or processed image data to the image interface unit. A design attribute of the high bandwidth hybrid image processing system can be as follows:

Keep the current (e.g. Intel X86 based) solution infrastructure including software assets for entire inspection system as much as possible.

Acceleration of compute intensive workloads of image processing in the inspection system with the cell processor.

Scalability for the future requirements (processing power, data volume, I/O bandwidth, etc.) as more image processing power is required.

X-platform with a Linux driver via switch.

Scalability for the future requirements (processing power, data volume, I/O bandwidth, etc.) as more image processing power is required.

Have modularity and flexibility to put in the inspection system.

Linux operating system for the acceleration module as well as the data acquisition module.

Figure 1:
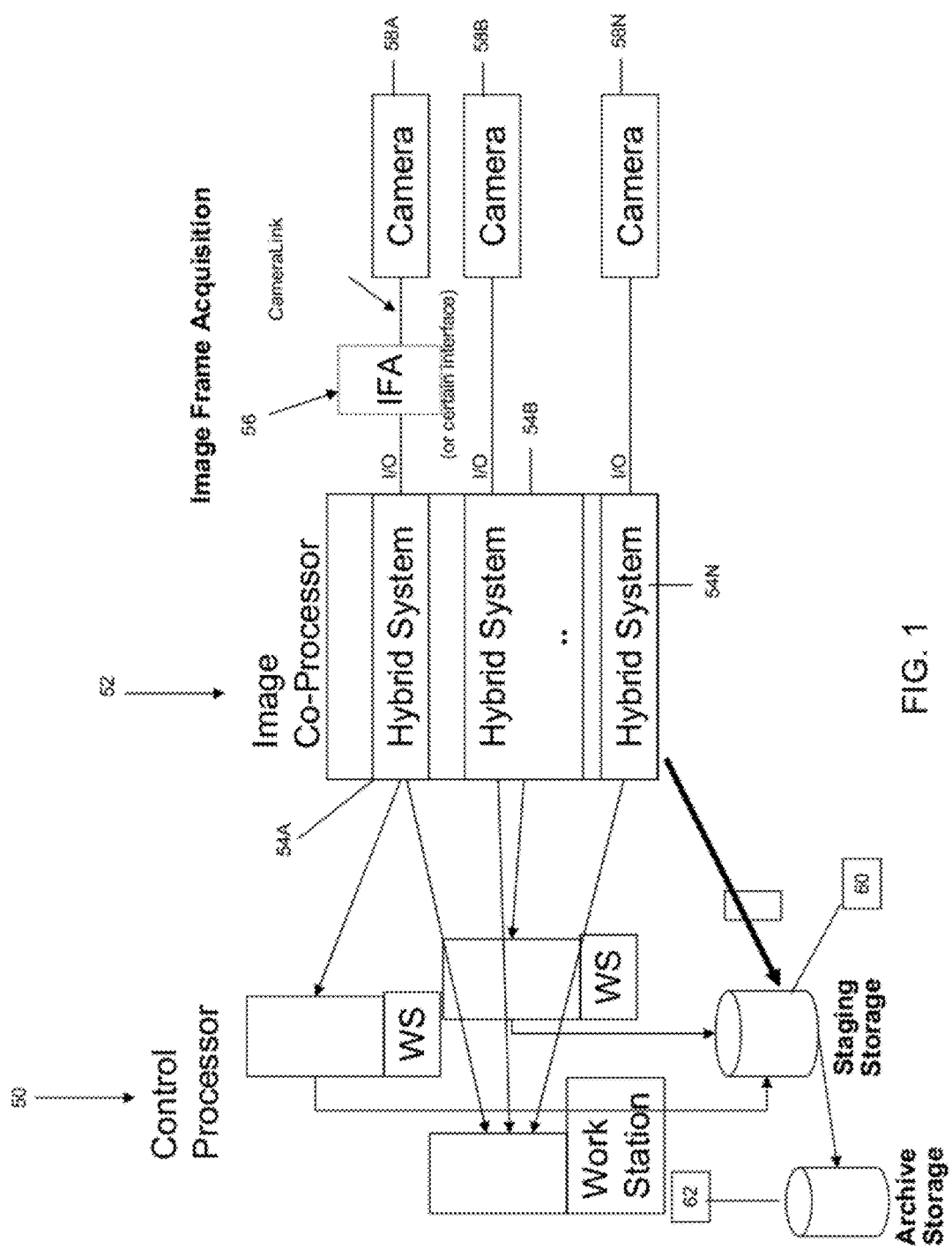
FIG. 1 shows a high bandwidth image processing/inspection system according to the present invention.

Referring now to FIG. 1, an image processing/inspection system according to the present invention is shown. As depicted, image recordation mechanisms (e.g., cameras) 58A-N record images and are attached to an image co-processor 52 (via one more image frame acquisition mechanisms 56 for image processing). The image co-processor 52 in turn is connected to a control processor 50. These components are connected in a single, monolithic, tightly integrated system. All image processing is done completely within the single system. Each component can only be used with a limited set of other components. Each component, and thus the entire system, can only run a single operating system. The current image inspection system can be used in a manufacturing line to detect defects in items such as LCD panels or semiconductor wafers. The system performs one or more scans to detect defect points. Image analysis is conducted on a magnified version of each defect point. A single Field of View (FOV) has multiple inspection threads, which run different algorithms, potentially at the same time for different areas in an image. One algorithm may take significantly longer to run than others. Image processing software libraries are used to implement the algorithms. Large amounts of image and log data need to be moved, processed, and stored during inspection, requiring high I/O speeds and bandwidth.

This new design approach is a processing/inspection system based on hybrid, reusable components/systems 54A-N that are combined with special purpose engines/accelerators. Image processing applications use algorithms that often have specialized functions that can benefit from special purpose processors. These special purpose processors can be used as accelerators to speed up image processing algorithms in a fine-grained, selective fashion that takes advantage of the strengths of both general purpose and special purpose processors. Thus, the present invention, combines image recording mechanisms/devices 58A-N such as cameras with a special purpose processor for image processing as well as a general purpose processor 50 for determining control information.

In a typical embodiment, images are received by hybrid systems 54A-N of image co-processor 52, which process the images to determine image data. This image data (and optionally the images themselves) are then communicated to control processor 50 and staging storage unit 60. Control processor 50 then processes the image data to determine control information. The images, image data, and/or control information can then be stored in archive storage unit 62.

Figure 2:
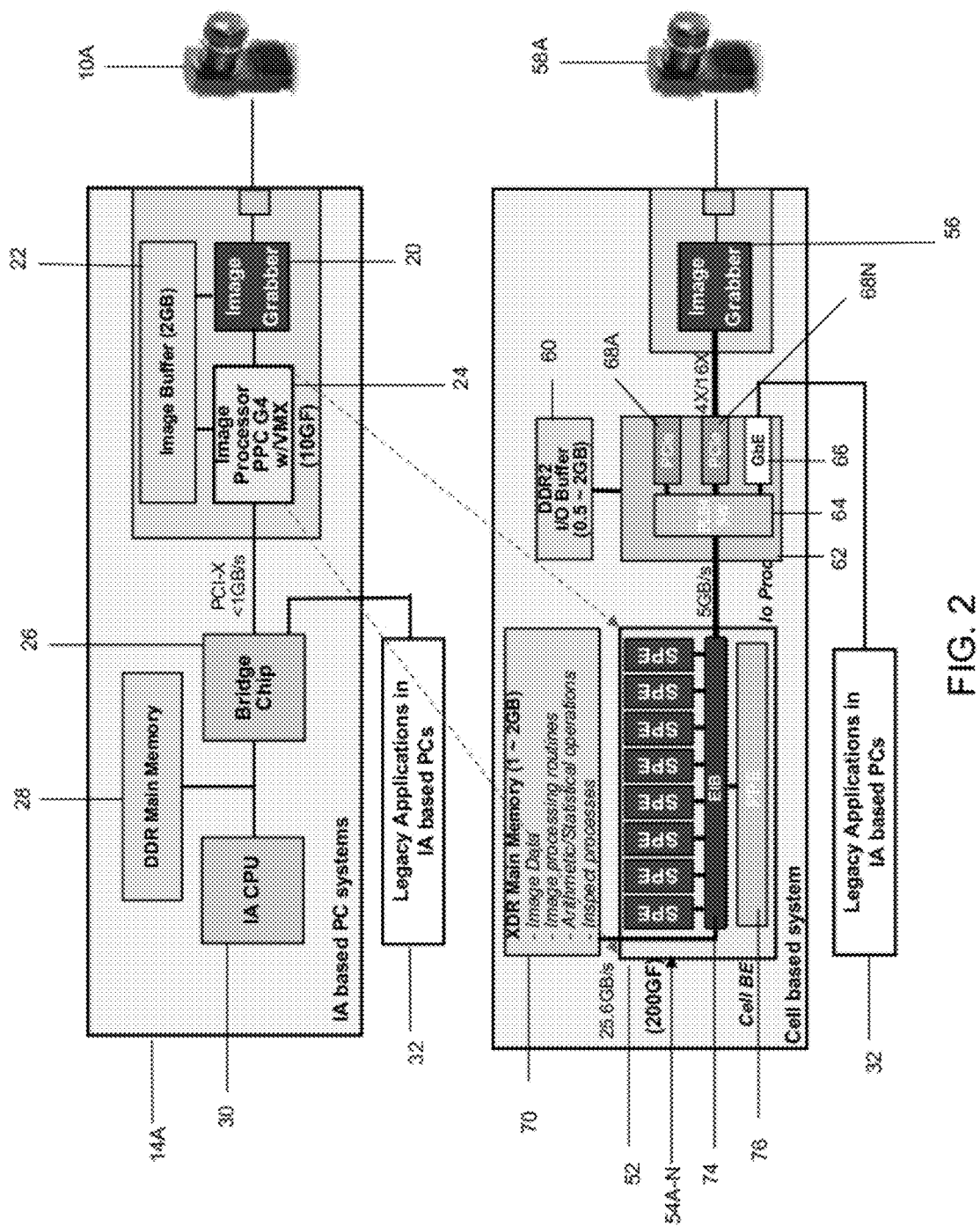
FIG. 2 shows a more detailed diagram of the system of FIG. 1 according to the present invention.

Referring now to FIG. 2, a more detailed diagram of the image processing system as well as its integration with an existing system is shown in greater detail. As depicted, image grabber 56 acquires images from one or more image recordation mechanisms 58A (which can be any type of camera now known or later developed such as a still image camera, video camera, etc.) and passes the image(s) to an input/output (I/O) processor 62. As further depicted, I/O processor 62 generally includes a set of express peripheral component interconnects (PCIs) 68A-N, a pure load balancer (PLB) 64 coupled to the set of express PCIs 68A-N; and a network interface 66 (e.g., GbE) coupled to the PLB 64 for interfacing with at least one legacy application 32 in IA-based PC 14A. An I/O buffer 60 is also shown coupled to the I/O processor 62.

Further shown within image co-processor 52 is a power processing element (PPE) 76, an element interconnect bus (EIB) 74 coupled to the PPE, and a set (e.g., one or more) but typically a plurality of special purpose engines (SPEs) 54A-N. SPEs 54A-N share the load involved with processing image(s) into image data. The division of work among SPEs 54A-N was not previously performed, and hence, previous systems are not suitable for current day and future image technology. As further shown, SPEs 54A-N feed image data, image processing routines, arithmetic/statistical operations, inspect processes, etc. to main memory 70 (which could be realized as staging storage unit 60 of FIG. 2.). Image co-processor 52 will leverage legacy application 32 in IA-based PC 14A to have general purpose or control processor 24 process the image or image data to determine control information.

As further depicted, IA-based PC system 14A of the related art obtains an image from image recordation mechanism 10A via image grabber 20, and passes the image to a general purpose image processor 24 for processing (e.g., utilizing image buffer 22). This sparsely processed image data is then passed to bridge chip 26, IA CPU 30, and (DDR) main memory 28. As can be seen, system 14A (of the related art) utilizes only a single general-purpose processor to process the image. Whereas, the system of the present invention (and of the above-incorporated patent applications) utilizes an image co-processor having a plurality of SPEs 54A-N as well as general purpose control processor 24 of IA-based PC system 14A. This is accomplished by communications through legacy application(s) 32 in IA-based PC system 14A. Thus, the present invention not only provides improved and accelerated image processing, but it does so by utilizing both existing and new infrastructure. It should be noted that the high bandwidth image processing system of the present invention is operable with multiple different computing platforms (e.g., Windows, Linux, etc.).

Along these lines, this disclosure (as further described in FIGS. 3-7) provides a more specific implementation of hybrid systems 54A-N of image co-processor 52.

Figure 3:
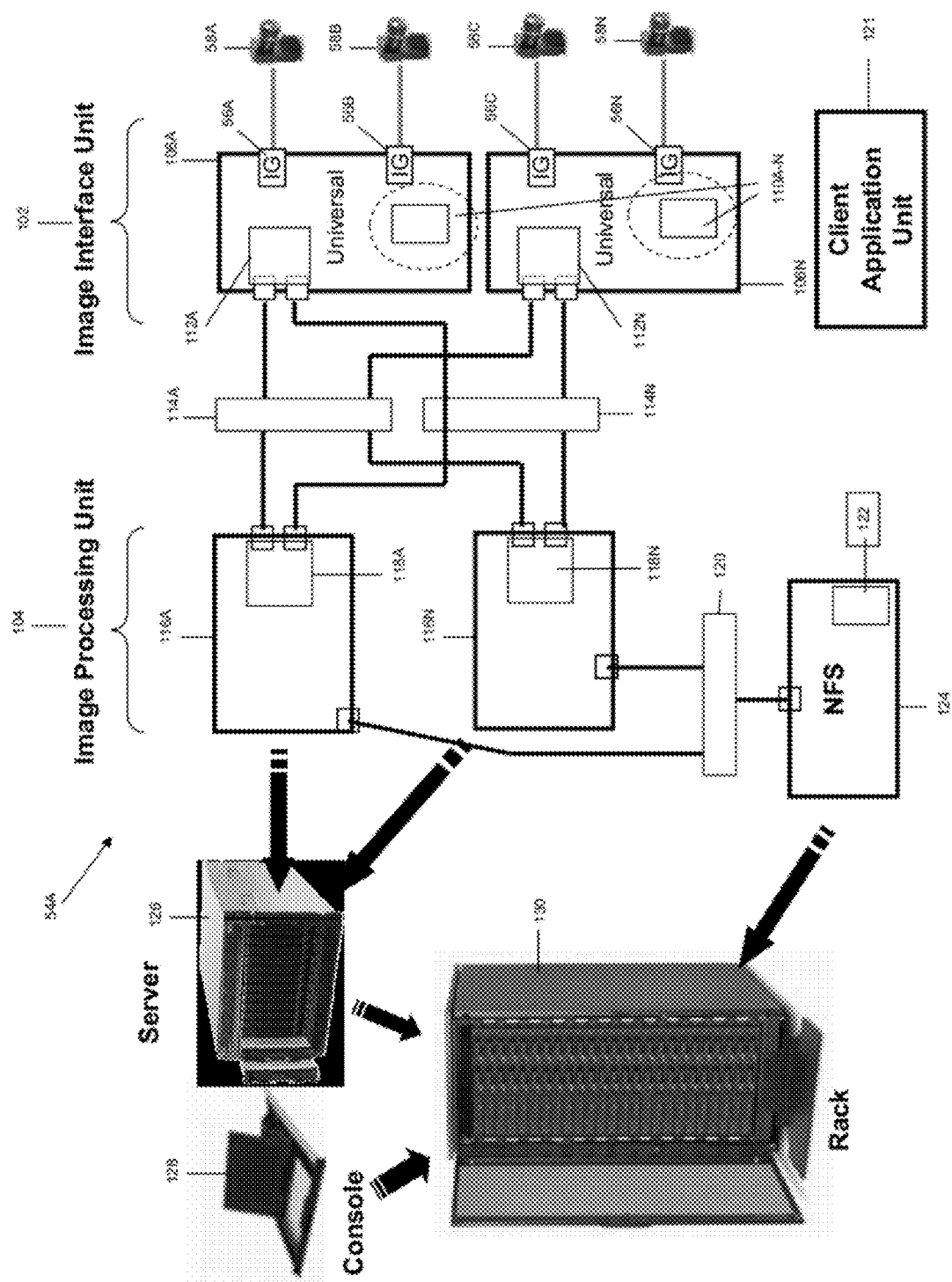
FIG. 3 shows a more detailed diagram of the high bandwidth hybrid-based co-processor of FIG. 1 according to the present invention.

Referring now to FIG. 3, a more detailed implementation of hybrid system 54A is shown. It should be appreciated that a single hybrid system 54A is shown for brevity purposes only and that other hybrid systems 54B-N could be similarly implemented. In any event, hybrid system 54A typically includes image interface unit 102 and image processing unit 104. Image interface unit 102 includes a set (at least one) of servers 106A-N that each have/communicate with a set of image grabbers 56A-N, a set of high density drives (HDDs) 110A-N, and a set of communications cards 112A-N. In an illustrative embodiment, set of servers 106A-N have universal operating system such as Linux, in which case the servers would be Linux servers. In addition, communications card 112A-N can be InfiniBand card/boards, but this also need not be the case (InfiniBand is a trademark of System I/O Inc., DBA InfiniBand Trade Association in the United States and/or other countries). As further shown, image processing unit 104 includes a set of processors 116A-N (e.g., QS21 processors) that each have a communications card 118A-N (e.g., InfiniBand) and a universal operating system. Interconnectivity between image interface unit 102 and image processing unit 104 is provided via a set of communications switches 114A-N (e.g., InfiniBand). As further shown in FIG. 3, processors 116A-N communicate with a network file system server 124 (that includes an HDD 122) via a switch 120 such as a Gigabit Ethernet (GbE) switch. Further processors 116A-N and NFS server 124 can communicate with one or more other computing devices such as server 126, console 128, and/or rack 130.

As will be further described below, image grabbers 56A-N receive image data corresponding to a set of images from image recordation mechanisms 58A-N, upon receipt, image interface unit 102 will generate commands for processing the image data using an image processing command library. The commands and image data will then be sent to image processing unit 104 using sets of communications cards 112A-N and 118A-N through set of communications switches 114A-N. Upon receiving the image data and commands, image processing unit 104 will interpret the commands, and assign tasks to a set of processing engines (e.g., SPEs of FIG. 2) to process the image data based on the commands (further described below in Section II). Results (e.g., processed image data) will then be communicated back to image interface unit 102 via sets of communications cards 112A-N and 118A-N, and sets of communications switches 114A-N. Along these lines, image data, commands, processed image data and/or any other data types received or created under the present invention can be stored in HDDs 110A-N, HDD 124, NFS server 122, and/or other computing devices 126, 128, and 130. Communication of data to NFS server 122 occurs via GbE switch 120. Access to processed image data can occur via client application unit 12, which can communicate with image interface unit 102 and/or image processing unit 104 (e.g., via GbE switch 120). By equipping servers 106A-N and processors 116A-N with universal operating systems such as Linux, the bandwidth is greatly enhanced (e.g., by at least 3× over previous implementations.

Figure 4:
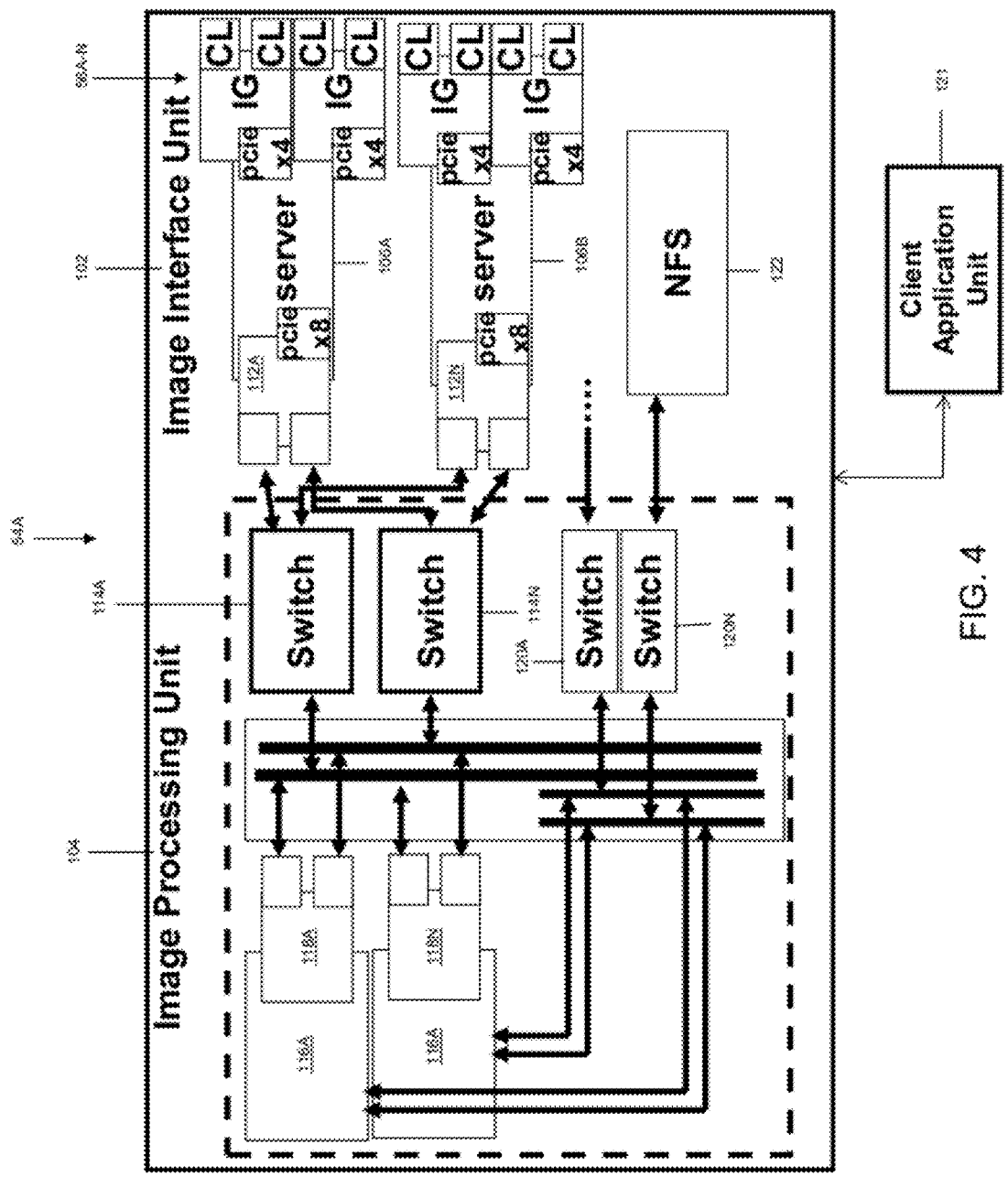
FIG. 4 shows a more specific implementation of the hybrid-based co-processor of FIG. 3 according to the present invention.

Referring now to FIG. 4, a more detailed architectural diagram of hybrid system 54A is shown. As depicted, image interface unit 102 includes set of servers 106A-N, set of image grabbers 56A-N, set of express PCIs, set of communications cards 112A-N, and set of CLs. Communication with processors 116A-N of image processing unit 104 occurs via set of communications switches 114A-N, and set of communication cards 118A-N. Further, communications with NFS server 122 occurs via set of GbE switches 120A-N. Still yet, communications with image interface unit 102 and/or image processing unit can occur via client application unit 121.

II. Illustrative Embodiments

Figure 5:
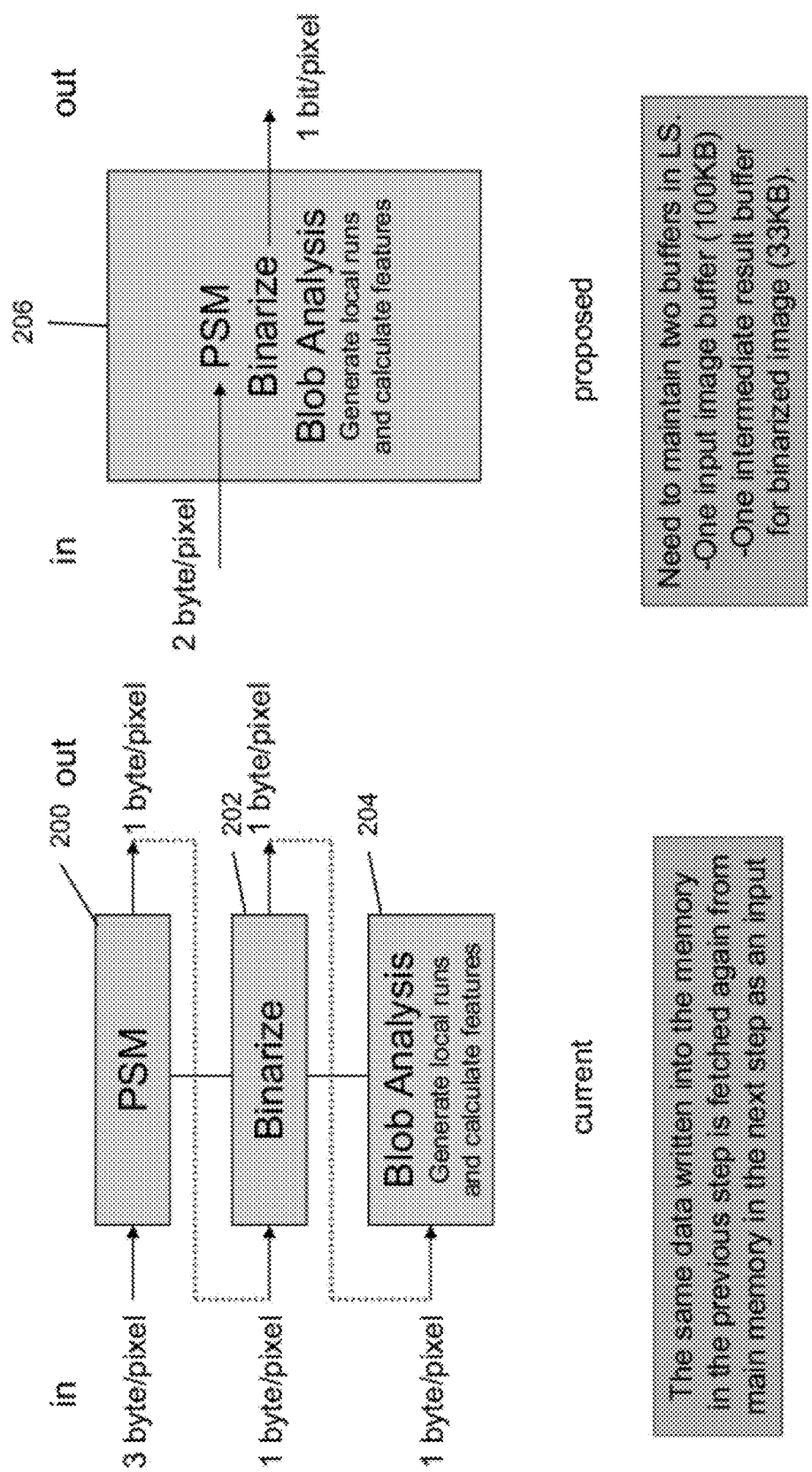
FIG. 5 depicts an illustrative diagram of showing multiple functions combined into a single module according to an aspect of the present invention.

The manner in which the image processing process is optimized under the present invention will now be explained with reference to FIGS. 5-9. Referring first to FIG. 5, it can be seen that three functions/modules are generally provided to process images. These modules are segmentation module 200, binarization module 202 and blob analysis module 204. Under the present approach, these modules are combined into a single module 206. Under this approach, as will be further explained below, each processing engine will utilize an input buffer and an intermediate output buffer.

Figure 6:
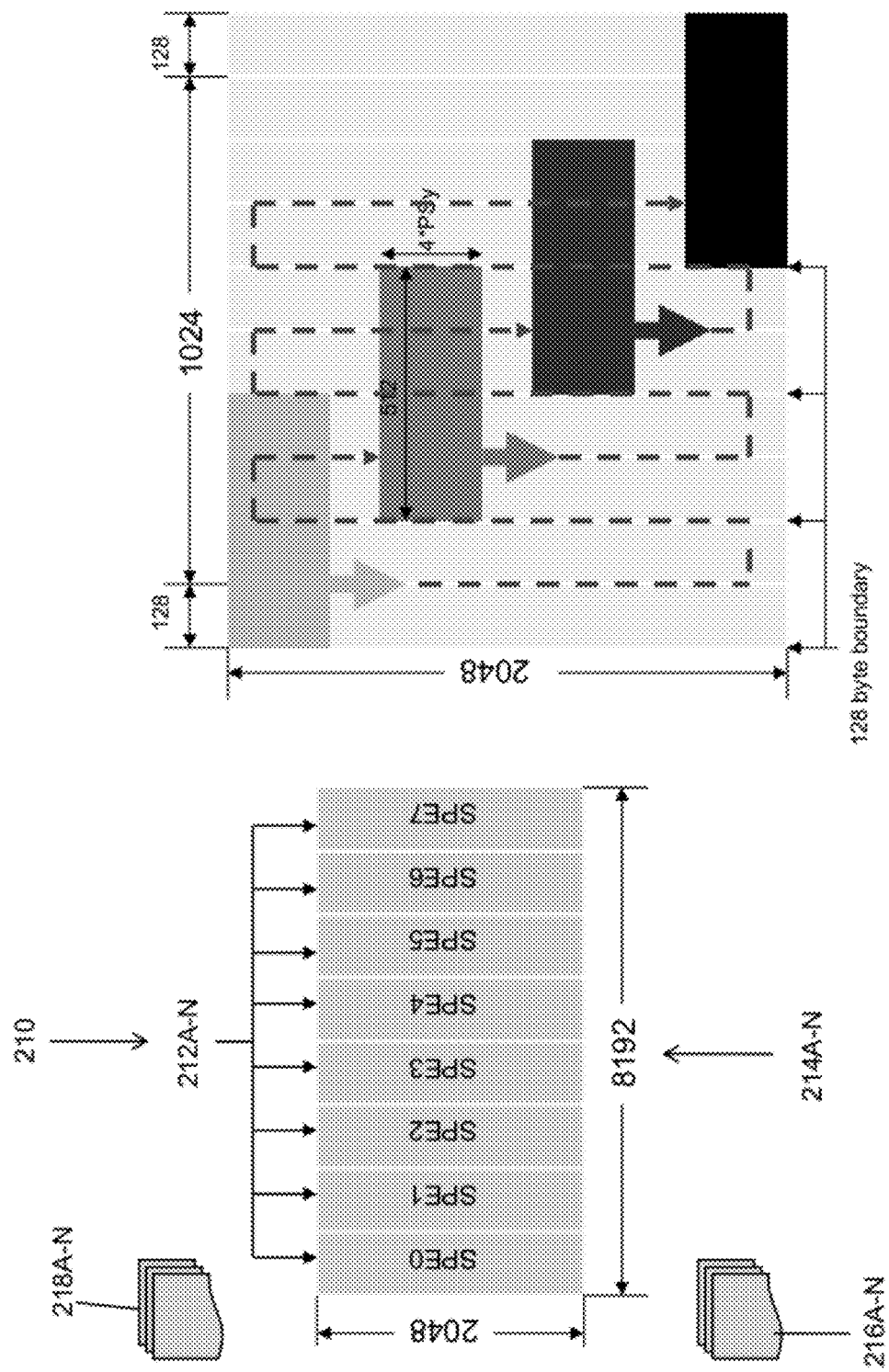
FIG. 6 depicts the segmentation and binarization of an image frame based on the aspect of FIG. 5.

As shown in FIG. 6, each image frame 210 of received image data will be segmented into a plurality of partitions 212A-N fed to processing engines 214A-N, and binarized. In a typical embodiment, each image frame 210 will be segmented into eight partitions. However, this need not be the case. Image binarization converts an image of up to 256 gray levels to a black and white image. The simplest way to use image binarization is to choose a threshold value, and classify all pixels with values above this threshold as white, and all other pixels as black.

In any event, each partition 212A-N will be fed to and processed by a separate one of a plurality of processing engines 214A-N. That is, there is typically a one to one relationship of partitions to processing engines where each partition is to be simultaneously processed. As indicated above, each processing engine 214A-N will utilize an input buffer 216A-N for receiving a corresponding partition 212A-N, and a result buffer 218A-N for receiving results from a corresponding processing engine 214A-N. The embodiment shown in FIG. 6 works under an assumption that: Input image size is 8192×2048, and PSx=31 and PSy=98. Further, the total number of bytes read from main memory is 8(SPE)*(512*4)*2048=2 times image size.

Figure 7:
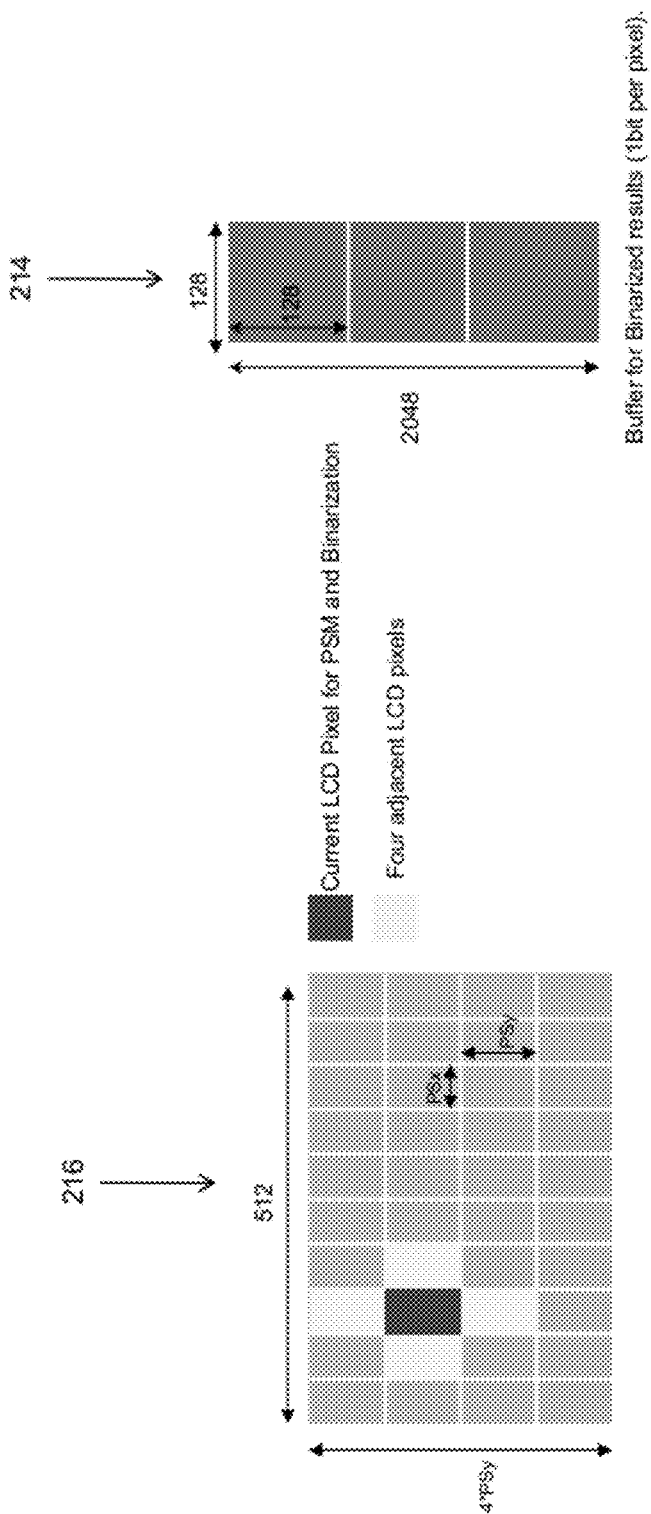
FIG. 7 depicts an input buffer and an intermediate output buffer.

Referring to FIG. 7, the buffer scheme is shown in greater detail. For input buffer 216, a buffer of four rows of LCD pixels (each row is 512 byte wide) is maintained in each processing engine. As the segmentation and binarization processes proceed through each row of LCD pixels in a raster scan order, one row of LCD pixels is fetched from main memory. Maintaining 512*4*PSy=200 KB of buffer for the image data in the local storage might be too much memory space. It should be noted that the input buffer 216 size can be reduced by half (100 KB), and the odd numbered lines and the even numbered lines are processed separately. The binarized results (one bit per pixel) will be written in a result buffer 216 (e.g., 128×2048 bit) in LS.

Each processing engine will also perform a blob analysis (e.g., generate local runs and calculate features). When the binarized results (128×2048) are ready to use, the blob analysis process can be started based on 128×128 tiles.

A "blob" is a region of touching pixels, analysis tools typically consider touching foreground pixels to be part of the same blob. The blob analysis is an "in image processing, a blob is defined as a region of connected pixels. It is the identification and study of these regions in an image. The algorithms discern pixels by their value and place them in one of two categories: the foreground (typically pixels with a non-zero value) or the background (pixels with a zero value).

Figure 8:
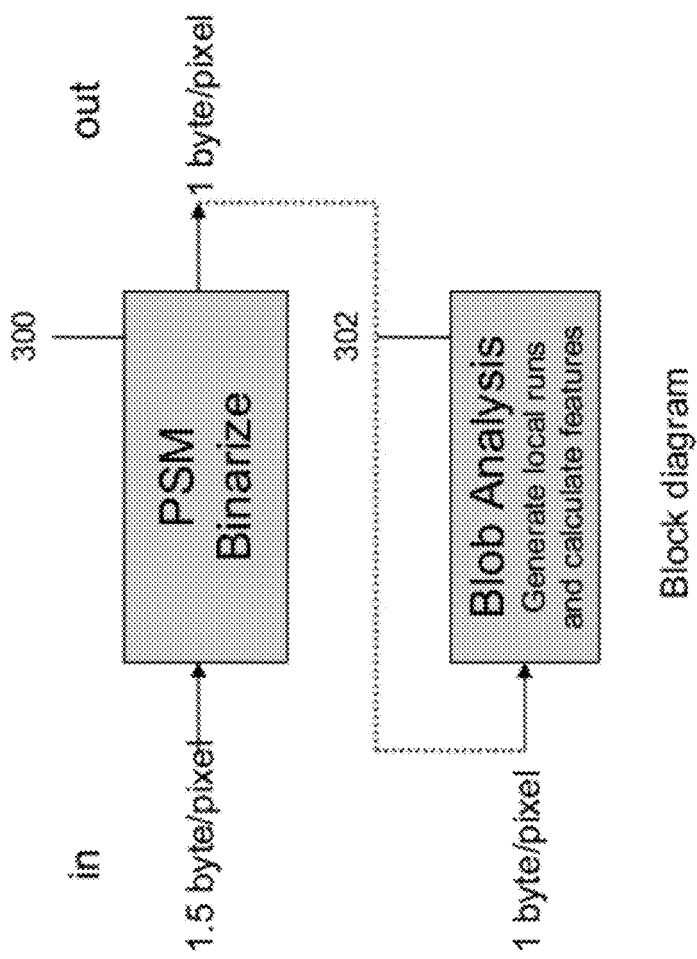
FIG. 8 depicts an illustrative diagram of showing multiple functions combined into a single module according to an aspect of the present invention.
Figure 9:
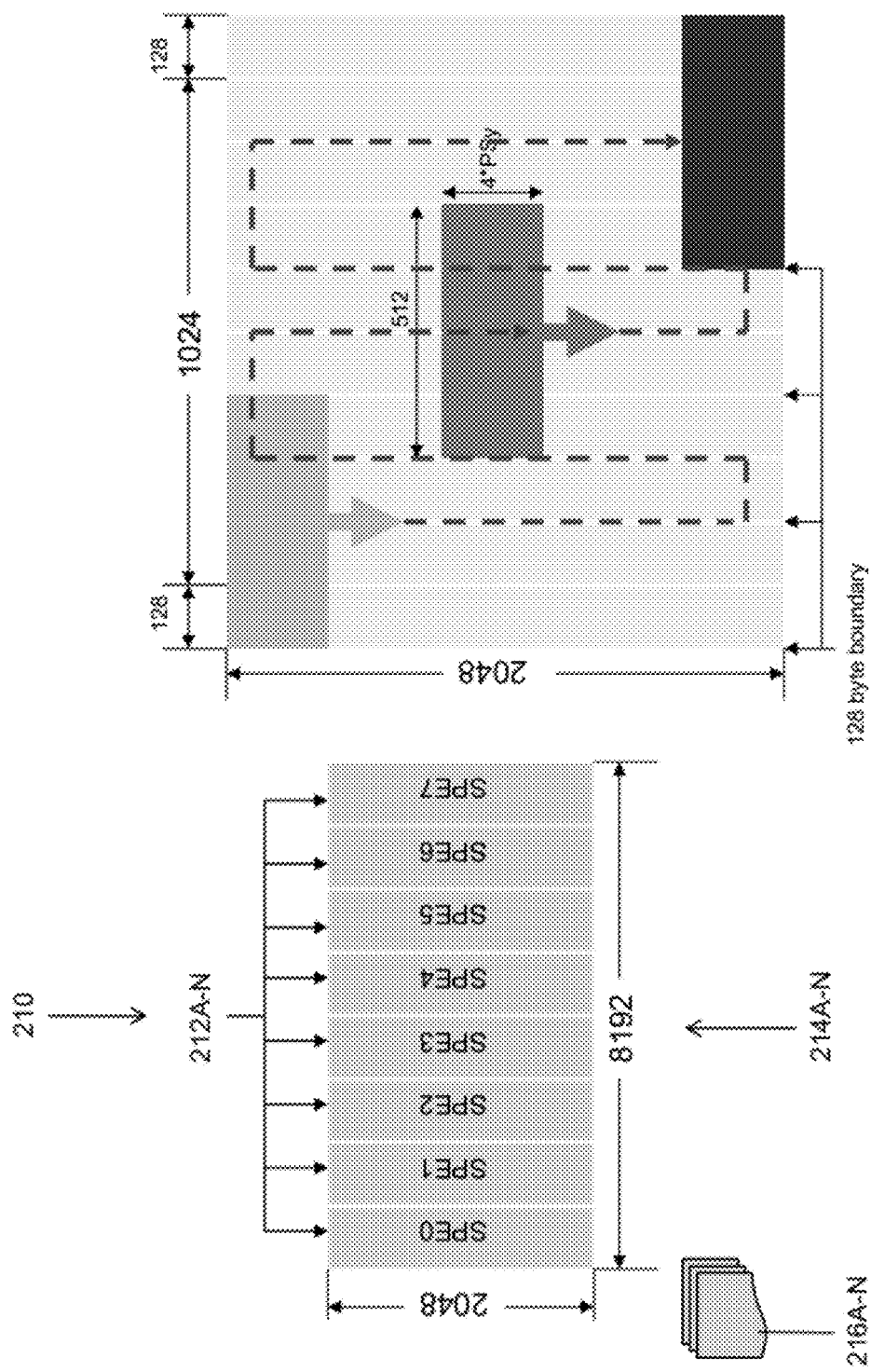
FIG. 9 depicts the segmentation and binarization of an image frame based on the aspect of FIG. 5.

Referring to FIG. 8, a diagram depicted an alternative embodiment is shown. Under this embodiment, the segmentation and binarization functions/modules are combined into a single module 300, while the blob analysis function/module 302 remains separate. This eliminates the need for each processing engine to utilize a result buffer, thereby only dictating that they utilize an input buffer 216A-N. The corresponding segmentation, binarization and blob analysis are still performed as described above. This is further shown in FIG. 9 where each image frame 210 is segmented into partitions 212A-N, fed to processing engines 214A-n on a 1-to-1 basis, binarized and blob analyzed (as described above). FIG. 9 works under the assumption that: Input image size is 8192×2048, and PSx=31 and PSy=98. In addition, the total number of bytes read from main memory is 8(SPE)*(512*3)*2048=1.5 times image size.

III. Computerized Implementation

Figure 10:
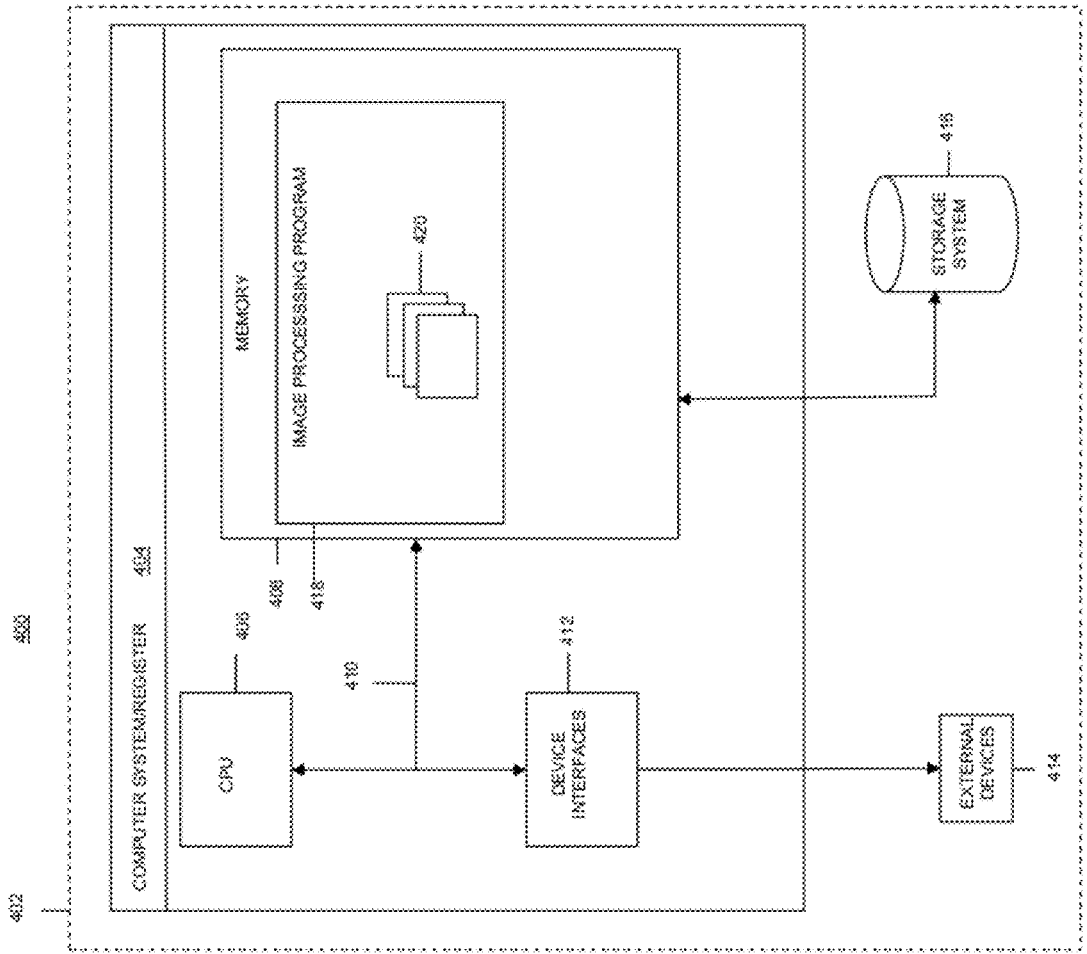
FIG. 10 depicts a more specific computerized implementation according the present invention The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

Referring now to FIG. 10, a computerized implementation 400 of an embodiment of the present invention is shown. As depicted, implementation 400 includes computer system 404 deployed within a computer infrastructure 402. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 402 is intended to demonstrate that some or all of the components of implementation 400 could be deployed, managed, serviced, etc. by a service provider who offers to implement, deploy, and/or perform the functions of the present invention for others.

As shown, computer system 404 includes a processing unit 406, a memory 408, a bus 410, and device interfaces 412. Further, computer system 404 is shown including external devices 414 and storage system 416 that communicate with bus 410 via device interfaces 412. In general, processing unit 406 executes computer program code, such as image processing program 418, which are stored in memory 408 and/or storage system 416. While executing computer program code, processing unit 406 can read and/or write data to/from memory 408, storage system 416, and/or device interfaces 442. Bus 140 provides a communication link between each of the components in computer system 404. Although not shown, computer system 404 could also include I/O interfaces that communicate with: one or more external devices such as a cash register, a scanner, a keyboard, a pointing device, a display, etc.; one or more devices that enable a user to interact with computer system 404; and/or any devices (e.g., network card, modem, etc.) that enable computer system 404 to communicate with one or more other computing devices.

Computer infrastructure 402 is only illustrative of various types of computer infrastructures for implementing the invention. For example, in one embodiment, computer infrastructure 402 comprises two or more computing devices (e.g., a server cluster) that communicate over a network to perform the various process of the invention. Moreover, computer system 404 is only representative of various possible computer systems that can include numerous combinations of hardware. To this extent, in other embodiments, computer system 404 can comprise any specific purpose computing article of manufacture comprising hardware with or without computer program code, for performing specific functions, any computing article of manufacture that comprises a combination of specific purpose and general purpose hardware/software, or the like. In each case, the program code (if included) and hardware can be created using standard programming and engineering techniques, respectively. Moreover, processing unit 406 may comprise a single processing unit, or be distributed across one or more processing units in one or more locations, e.g., on a client and server. Similarly, memory 408 and/or storage system 416 can comprise any combination of various types of data storage and/or transmission media that reside at one or more physical locations. Further, device interfaces 412 can comprise any module for exchanging information with one or more external devices 414. Still further, it is understood that one or more additional components (e.g., system software, math co-processing unit, etc.) not shown in FIG. 10 can be included in computer system 404.

Storage system 416 can be any type of system capable of providing storage for information under the present invention. To this extent, storage system 416 could include one or more storage devices, such as a magnetic disk drive or an optical disk drive. In another embodiment, storage system 416 includes data distributed across, for example, a local area network (LAN), wide area network (WAN) or a storage area network (SAN) (not shown). In addition, although not shown, additional components, such as cache memory, communication systems, system software, etc., may be incorporated into computer system 404.

In memory 408 of computer system 404 is image processing program 418, which includes a set (at least one) of modules 420. The modules generally enable computer infrastructure 402 to provide the functions of the present invention as described herein in conjunction with FIGS. 1-10, as well and any subject matter incorporated by reference. For example (among other things), set of modules 420 is configured to: structure code of the image processing system to combine a segmentation function and a binarization function into a single module; receive image data on an interface unit from a set of image recordation mechanisms; send the image data and commands for processing the image data to an image processing unit; segment each frame of the image data into a plurality of partitions; process the plurality of partitions with a plurality of processing engines, each of the plurality of processing engines processing a different one of the plurality of partitions; binarize the image data; analyze the image data prior; generate and interpret the commands on the image processing unit; schedule tasks for processing the image data on the image processing unit, etc.

While shown and described herein as a, image processing system, method, and program product, it is understood that the invention further provides various alternative embodiments. For example, in one embodiment, the invention provides a computer-readable/useable medium that includes computer program code to enable a computer infrastructure to provide image processing. To this extent, the computer-readable/useable medium includes program code that implements one or more of the various processes described herein. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 408 (FIG. 10) and/or storage system 416 (FIG. 10) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide image processing. In this case, the service provider can create, maintain, and support, etc., a computer infrastructure, such as computer infrastructure 402 (FIG. 10) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a method of generating a system a computer-implemented method for image processing. In this case, a computer infrastructure, such as computer infrastructure 402 (FIG. 10), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 404 (FIG. 10), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or processing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for optimizing an image processing system, comprising:
 structuring code of the image processing system to combine a segmentation function and a binarization function into a single module;
 segmenting each frame of the image data received by the image processing system into a plurality of partitions; and
 processing each of the plurality of partitions with a plurality of processing engines, wherein every one of the plurality of partitions is completely processed using a different one of the plurality of processing engines.

2. The method of claim 1, the structuring further comprising combining an analysis function into the single module.

3. The method of claim 1, each of the plurality of processing engines comprising at least one of an input buffer and a result buffer.

4. The method of claim 1, further comprising performing a blob analysis on the image data with the plurality of processing engines.

5. The method of claim 1, further comprising receiving the image data from an image grabber.

6. An image processing system, comprising:
 a module for segmenting each frame of the image data into a plurality of partitions and for binarizing the image data; and
 a plurality of processing engines for processing all of the plurality of partitions in the image data, the plurality of processing engines each completely processing a different one of the plurality of partitions.

7. The system of claim 6, the module being further configured to analyze the image data.

8. The system of claim 6, each of the plurality of processing engines comprising at least one of an input buffer and a result buffer.

9. The system of claim 6, further comprising the plurality of processing engines performing a blob analysis on the image data.

10. The system of claim 6, further comprising an image grabber for receiving the image data.

11. A method for processing images, comprising:
 receiving image data on an interface unit from a set of image recordation mechanisms;
 sending the image data and commands for processing the image data to an image processing unit;
 segmenting each frame of the image data into a plurality of partitions; and
 processing all of the plurality of partitions with a plurality of processing engines, each of the plurality of processing engines completely processing a different one of the plurality of partitions.

12. The method of claim 11, further comprising:
 binarizing the image data, wherein the binarizing and the segmenting are performed by a single module; and
 analyzing the image data prior.

13. The method of claim 11, further comprising:
 interpreting the commands on the image processing unit; and
 scheduling tasks for processing the image data on the image processing unit.

14. The method of claim 11, the receiving occurring via a plurality of image grabbers of the image interface unit.

15. A program product stored on a computer readable storage medium for processing images, the computer readable medium comprising program code for causing a computer system to:
 receive image data on an image interface unit from a plurality of image recordation mechanisms;
 send the image data and commands for processing the image data to an image processing unit;
 segment each frame of the image data into a plurality of partitions; and
 process all of the plurality of partitions with a plurality of processing engines, each of the plurality of processing engines completely processing a different one of the plurality of partitions.

16. The program product of claim 15, the computer readable medium further comprising program code for causing the computer system to:
 binarize the image data, wherein the binarizing and the segmenting are performed by a single module; and
 analyze the image data.

17. The program product of claim 15, the computer readable medium further comprising program code for causing the computer system to:
 interpret the commands on the image processing unit; and
 schedule tasks for processing the image data on the image processing unit.

18. A method for deploying an application for processing images, comprising:
 providing a computer infrastructure being operable to:
  receive image data image on an interface unit from a plurality of image recordation mechanisms;
  send the image data and commands for processing the image data to an image processing unit;
  segment the image data into a plurality of partitions; and
  process the plurality of partitions with a plurality of processing engines, each of the plurality of processing engines completely processing a different one of the set of partitions.

19. The method of claim 18, the computer infrastructure being further operable to:
 binarize the image data, wherein the binarizing and the segmenting are performed by a single module; and
 analyze the image data.

20. The method of claim 18, the computer infrastructure being further operable to:
 interpret the commands on the image processing unit; and
 schedule tasks for processing the image data on the image processing unit.

* * * * *